Sept. 26, 1961   J. H. LEONARD   3,001,397
METHOD AND APPARATUS FOR MEASURING LIQUID FLOW-VOLUME
Filed Jan. 29, 1958

INVENTOR.
JOE H. LEONARD.
BY H. Barry Mogerman.
ATTORNEY.

United States Patent Office
3,001,397
Patented Sept. 26, 1961

3,001,397
METHOD AND APPARATUS FOR MEASURING LIQUID FLOW-VOLUME
Joe H. Leonard, 12242 Lesley St., Garden Grove, Calif.
Filed Jan. 29, 1958, Ser. No. 711,923
15 Claims. (Cl. 73—194)

This invention relates to the measurement of liquid flow volumes. More particularly, it relates to a simple, accurate and inexpensive apparatus for measuring liquid flow-volumes and to a method for making such measurements without interrupting over-all continuity of flow.

It is often necessary to measure liquid flow-volumes in the course of various medical, scientific and laboratory procedures. Frequently, in a closed system wherein liquid is being pumped continuously by a positive displacement device, or in a system where flow is caused by a relatively constant hydraulic head, this information is desired so that flow rate may be determined, adjusted and thereafter periodically checked.

While many flow meter devices are available they are often either more expensive than conditions of use warrant, require larger flows for accurate operation than are being used, are not made of materials of construction suitable vis-a-vis corrosion and contamination for use with the liquid being handled, or cannot be adequately corrected for changing rheological properties of slurries. Thus, a liquid such as blood, the viscosity of which changes not only with temperature but also with physiological conditions such as blood count, cannot be metered using conventional apparatus such as that of the variable cross-section tapered tube type (i.e. rotameters) or of the type which measures flow as a function of pressure-drop across an orifice.

In the past, devices such as drip meters or drip tubes have been used to solve some of these problems. These devices permit the observation of drop-wise flow and are often used in connection with venoclysis, gastric feedings and the like. In the use of these devices, the drops flowing for a given period of time are counted, the number of drops converted into a unit of volume such as cubic centimeters, and the rate determined by solving the equation: Rate equals volume divided by time. Since drops are not actually of uniform size, the measurement is approximate at best. It is also subject to errors in the counting of drops.

Accordingly, it is an object of this invention to provide a simple, inexpensive apparatus which is capable of being used to measure the flow-volume in a continuously flowing system without interrupting the over-all continuity of flow.

Another object of the invention is to provide an apparatus for measuring liquid flow-volume which can be made of a wide variety of corrosion resistant materials.

Still another object of the invention is to provide an apparatus which will measure flow-volume accurately and directly without need for recalibration as the hydraulic and rheological characteristics of the flowing liquid change.

A further object of the invention is to provide a method for determining the liquid flow rate in a continuously flowing system without interrupting the over-all continuity of flow.

Briefly stated, these and other objects are achieved by using a two reservoir system through which the entire flow of the system passes in series. A valve is provided between these reservoirs which can cut off flow between them. A vent connects the upper portions of these reservoirs. The use of the apparatus essentially involves measurement of the change in reservoir level when the valve is closed for a predetermined time. During this measuring interval one reservoir is filling and the other reservoir is being emptied.

Other objects of the invention will be apparent to those skilled in the art from a consideration of the drawings and description which follow:

In the drawings, wherein like numerals designate like parts:

Figure 1:
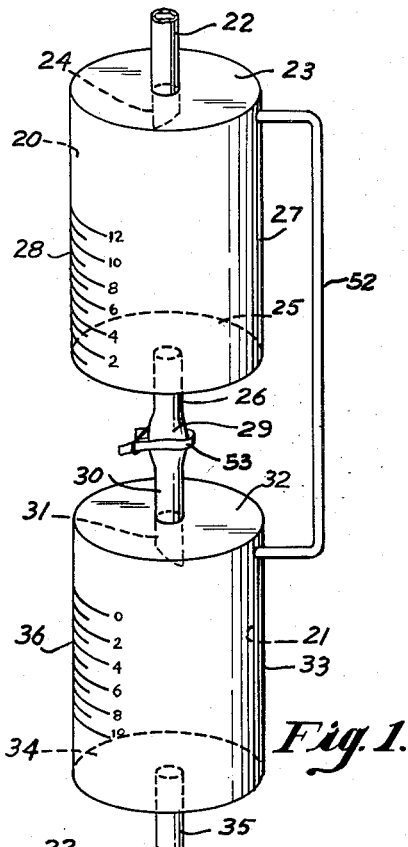
FIG. 1 represents a perspective elevational view of an apparatus which embodies the instant invention.

Referring now to the drawings, with particular reference to FIGURE 1, the liquid flow-volume measuring devices includes a first reservoir, generally designated as 20 and a second reservoir, generally designated as 21. As shown in FIGURE 1, these reservoirs are cylindrical but they may be any particular shape and not necessarily of the same shape. The reservoirs 20, include an inlet 22 which pierces the top 23 and preferably but not necessarily, terminates within the reservoir in a tapered-tube section 24 which is adapted to cause drop formation and to direct liquid flow away from the underside of the top 23. Reservoir 20 also includes a bottom 25 which further includes an outlet 26. The outlet may be integral with the bottom or a separate tubular piece. It is preferably, but not necessarily, in axial alignment with inlet 22. In the embodiment shown in FIGURE 1 the sides 27 of first reservoir 20 are calibrated, as at 28, with volumetric calibrations or gauge-marks which increase in numerical value from bottom to top and are thus adapted to measure cumulated volume as the reservoir 20 is filled.

Reservoir 20 may be made of any dimensionally stable material which is compatible, from the point of view of corrosion and contamination, with the liquid being measured. The preferred materials are those which are transparent or translucent and include glass, ceramics, and various transparent or translucent plastics such as for example, polystyrenes, polyurethanes, alkyl-substituted acrylic acid polymers, polymerized polyamines and polyamides, polymerized tetrafluoroethylene, phenolic polymers, vinyl chloride-vinylidene chloride copolymers and the like. The obvious advantage of using such transparent or translucent materials is that liquid level in reservoir 20 can be observed directly and immediately read, in terms of volume in the reservoir, with the aid of calibrations or gauge-marks 28.

However, when problems of corrosion or contamination are so severe that no suitable transparent or translucent material can be found, equally satisfactory embodiments can be made using opaque materials including metals and metal alloys. In such cases, no series of calibrations, such as 28 is required but instead the capacity of the reservoir, when filled to a fixed point or gauge-mark is determined. Thereafter, a remote indirect level indicating means, such as for example, a pair of electrodes connected to a conductivity circuit, a manometer type of device or the like is used to determine when the level of liquid within the reservoir has reached a particular gauge-mark.

The outlet 26 of the reservoir 20 in turn communicates, via a piece of flexible tubing 29, with the inlet 30 of the second reservoir 21. Inlet 30 may have a tapered portion 31 which is similar to the tapered portion 24 of inlet 22.

Associated with flexible tubing 29 is a pinch clamp 53 which is adapted to cut off flow through flexible tube 29. In lieu of such an arrangement any relatively quick acting type of valve mechanism may be inserted between outlet 26 and inlet 30 including types such as plug valves, gate valves, globe valves, needle valves and the like, which do not operate by compressing or pinching off a section of flexible tubing.

Reservoir 21 may be constructed of the same material used for reservoir 20 and, like reservoir 20, includes a top 32, sides 33 and a bottom 34. The second reservoir further includes an outlet 35.

This reservoir may also be calibrated as at 36 and, if a full set of volumetric calibrations or gauge marks are provided, they should increase numerically in a downward direction, as distinguished from the calibrations 28 which increase numerically in an upward direction. Alernatively, as will be apparent from the description of the manner in which the apparatus is used, the second chamber need not be provided with calibrations but may, if desired, merely be provided with a fixed level mark (e.g. the zero mark shown at 36). When the reservoir is made of opaque material, means which are similar to those suggested for reservoir 20, may be provided for the determination of liquid level.

In a variant of the apparatus of FIGURE 1 (not shown) reservoir 21 may be calibrated as at 36 and reservoir 20 may contain no calibration scale.

Finally, a vent such as conduit 52 is provided which connects the upper portion of reservoir 21 with the upper portion of reservoir 20 through the sides 33 and 27 respectively. Alternatively, either or both ends of conduit 52 may enter the reservoirs through their tops. If conduit 52 is rigid it may also serve the function of keeping reservoirs 21 and 20 in permanent spaced-apart relationship.

In another embodiment (not shown) conduit 52 may take the form of a tube which begins within the upper portion of reservoir 21, pierces top 32, bottom 25 and terminates within the upper portion of reservoir 20.

Figure 2:
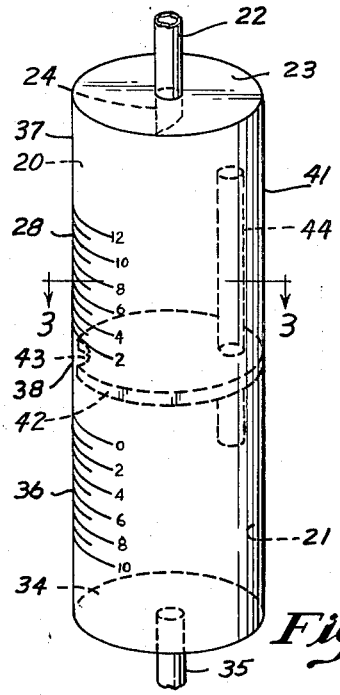
FIG. 2 represents a perspective elevational view of a second apparatus which also embodies the invention.
Figure 3:
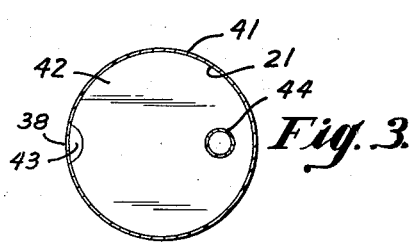
FIG. 3 is a cross-section taken on line 3—3 of FIGURE 2.

In FIGURES 2 and 3 a second embodiment of the invention is shown. In this embodiment, the liquid flow-volume measuring device includes a cylindrical housing 37. This housing may be made of the materials specified above but, most suitable, are those transparent or opaque materials which are elastically deformable. The housing 37 includes a top 23, an inlet 22 having a tapered portion 24, a bottom 34 including an outlet 35, and sides 41 which include an elastically deformable side portion 38. When a non-elastically deformable material is used for the construction of the balance of the housing, side portion 38 may take the form of an integral insert of elastically deformable material. Simplicity of housing construction therefore is best served when the entire housing 37 is constructed of an elastically deformable material preferably a transparent or translucent material such as, for example, polyethylene, polyurethane, and the like. Suitable plastics for use in the invention may be selected, as a function of desired physical properties, by making use of standard reference works such as the plastics properties chart included in "Modern Plastics, Encyclopedia Issue" vol. 35 No. 1-A, published in Sept. 1957 by Modern Plastics, New York city.

Within the housing, a liquid impervious diaphragm or divider 42 of corrosion resistant material, divides the housing 37 into a first reservoir 20 and a second reservoir 21. The diaphragm further includes a peripheral cutout flow channel 43 (best seen in FIG. 3) and a hole adapted to receive and retain vent tube 44, said vent tube connecting the upper portion of reservoir 20 with the upper portion of reservoir 21. Vent tube 44 may be located anywhere except in axial alignment with inlet 22.

The peripheral flow channel 43 is adjacent the elastically deformable portion 38 of sides 41.

Sides 41 may be calibrated in the first reservoir 20 as shown at 28 and/or in the second reservoir 21 as shown at 36. These calibrations are identical to those shown in FIGURE 1 except that they take into account the diminished net volume of the reservoir caused by vent tube 44.

Flow channel 43 may take any convenient shape and, as shown in FIGURE 3 may be arcuate, or may resemble a notch, a chord, or the like. Its cross-section must be large enough to handle flow of liquid through the apparatus without causing liquid to collect in reservoir 20. Regardless of the shape of the channel it must be capable of complete blockage when elastically deformable portion 38 is idented, as by the pressure of a digit or thumb, and consequently must have a shape to which portion 38 is capable of conforming.

Diaphragm 42 thus presents no passage for liquid other than flow channel 43 and the combination of the flow channel 43 and deformable side portion 38 constitutes a valve means. Other valve means may be used in lieu of the combination of channel 43 and portion 38.

Diaphragm 42 may be of any thickness but it is preferred that it be thick enough so that, when flow channel 43 is closed, the deformation of wall portion 38 takes place substantially entirely within the segment of the housing 37 within which the diaphragm 42 is positioned. Thus, such deformation of portion 38 will not affect the volume of either reservoir 20 or 21 and will not change the accuracy of calibrations 28 and 36.

Figure 4:
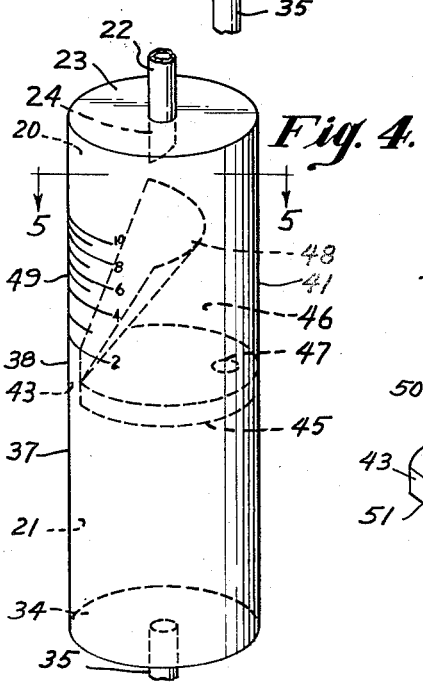
FIG. 4 represents a perspective elevational view of a third apparatus which also embodies the invention.
Figure 5:
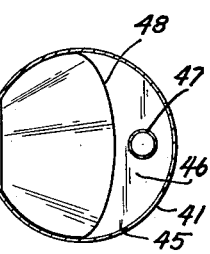
FIG. 5 is a cross-section taken on line 5—5 of FIGURE 4.

FIGURES 4 and 5 represent another embodiment of the invention very similar to that shown in FIGURES 2 and 3. As shown in FIGURE 4, the apparatus includes a housing 37 including a top 23, an inlet 22 having a tapered portion 24, a bottom 34, an outlet 35 in bottom 34 and sides 41. With respect to these portions, the apparatus is identical to the apparatus of FIGURE 2.

The housing 37 contains a diaphragm 45, positioned internally, which divides the housing into an upper reservoir portion, generally designated by the numeral 46 and a lower reservoir 21. The diaphragm 45 further includes a vent hole 47 which connects the reservoir 21 with the upper reservoir portion 46. An integral portion of the diaphragm or divider (which may alternatively be a separate piece which has been secured thereto by thermoplastic fusion techniques and the like) is the baffle wall 48 which is attached to sides 41 at each longitudinal edge thereof to form a liquid impervious joint and to thus create a first liquid reservoir 20 within the upper reservoir portion 46. The wall 48 as shown in FIGURE 4 is generally arcuate in cross section and is positioned underneath the inlet portion 24 in spaced-apart relationship to the underside of the top 23 so that liquid entering the housing flows down the funnel-shaped concave surface. The calibrations 49 on the wall portion give a numerical indication of the volume enclosed between the top of diaphragm 45, wall 48 and sides 41. These calibrations increase from the bottom up and, at the lower portion of the scale, a fixed increment of volume represents a greater linear distance on the scale than at the upper portion since, because of the taper of wall 48, the capacity of reservoir 20 (in units of volume per unit of height) increases from bottom to top. Thus, low values of reservoir volume are easily and accurately gauged.

Where wall 48 joins the top of diaphragm 45 a flow channel 43 is provided which is similar to the channel 43 in FIGURE 2. Adjacent flow channel 43 is elastically deformable side portion 38 which is also similar to the corresponding part in FIGURE 2. The combination of channel 43 and side portion 38 acts as a valve means. The embodiment in FIGURE 4, accordingly, while operating in the same manner as the embodiment in FIGURE 2, has the dual advantage of (a) requiring no vent tube such as part 44 in FIGURE 2 and (b) having calibrations in the reservoir 20 which are easier to read at low volumes.

Wall 48 need not be arcuate in cross-section but may be of any shape provided only that it is located so as to receive the entire outflow of inlet 22, but preferably wall 48 should be tapered so as to change the cross-section of reservoir 20.

Figure 6:
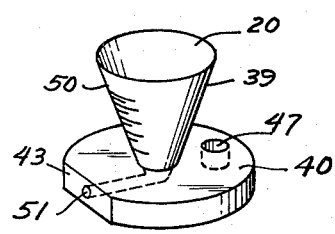
FIG. 6 represents a perspective elevational view of an alternate internal construction suitable for use with the external housings of FIGURES 2 and 4.

In FIGURE 6 another form of diaphragm is shown which is equally suitable for use in the housing of FIGURES 2 and 4. In this embodiment the diaphragm generally designated as 40, includes a vent hole 47 which may contain a tube if desired and a flow channel 43. It also has an integral, generally funnel shaped, baffle wall 39 which is calibrated as shown at 50. The interior of the continuous baffle wall 39 constitutes a first reservoir 20. Within the diaphragm 40 is a conduit 51 which leads from the upper surface of the diaphragm at the bottom of the funnel shaped reservoir 20, transversely across the diaphragm to a discharge point on the side of flow channel 43. Flow channel 43 may also serve as an overflow drain. Since flow channel 43 is adjacent to the elastically deformable wall portion 38, these two elements again, in this embodiment, constitute a valve means. Because reservoir 20 is tapered and decreases in cross-section from top to bottom, the calibrations 50 have the same characteristics as calibrations 49 in FIGURE 4.

When a diaphragm such at 40 is used, wherein the calibrations 50 are on the internal baffle wall 39, the side walls 41 of the housing 37 must be transparent since readings must be made through these walls.

Consider now the manner in which these devices are operated, with particular reference to the apparatus of FIGURE 1. Before making any measurements (i.e. before system start-up) the entire apparatus is filled with a gas which is inert with respect to the liquid being measured. Gases such as air, nitrogen, carbon dioxide and the like are suitable for this purpose, the preferred gases being those which are both inert to and limitedly absorbable by the liquid.

The lower reservoir 21 is then filled with the liquid being measured to any arbitrary level (e.g. the zero mark on scale 36). To facilitate filling the apparatus with gas and liquid, auxiliary inlets may be provided if desired. After filling with liquid and gas, the apparatus is operatively connected to the system, the flow volume of which is being measured, so that the entire flow of the system passes through the apparatus.

Under non-measuring flow conditions the liquid enters the apparatus at 22, passes through the upstream reservoir 20 (which is empty) through outlet 26, tube 29, inlet 30 and into downstream reservoir 21. The liquid level in reservoir 21 will vary somewhat as hydraulic conditions change but, under ordinary circumstances the level is relatively constant. Of course, if the internal pressure of the system is increased appreciably, the level in reservoir 21 will rise somewhat. During this non-measuring period, reservoir 20 remains filled with the previously introduced inert gas (the pressure of which is the system pressure) and that portion of reservoir 21 not containing liquid also remains filled with inert gas.

When it is desired to measure rate of flow, valve 53 (which has previously been open) is closed for any measured time interval. During that time interval full flow is maintained through outlet 35 since the system is fed from reservoir 21. Meanwhile, reservoir 20 is being filled with liquid, and gas is being displaced from reservoir 20, through vent 52, into reservoir 21. At the end of the fixed time period the level in reservoir 20 is measured, using calibrations 28. Using the equation: Rate equals volume divided by time, it is possible to calculate rate since both volume and time are known.

Valve 53 is then opened, the liquid in reservoir 20 quickly replenishes the now depleted liquid supply in reservoir 21 and, as it does so, displaces the inert gas from reservoir 21, via vent 52, into reservoir 20.

The only requirement of such a method is that the measuring time (or, alternatively, the reservoir volumes) be such that reservoir 21 does not become completely exhausted during the period when valve 53 is closed.

In a continuous, full-flowing liquid flow path the same apparatus may be used in still another method. In this method, when valve 53 is closed, the drop in level in reservoir 21 is measured using calibrations 36 instead of the rise in level of reservoir 20. Otherwise the second method is identical to the first method.

The apparatus shown in FIGURES 2 and 4 is employed in a similar manner. After preliminary filling with liquid and inert gas, measurements are made by depressing elastically deformable wall portions 38 thus cutting off liquid communication between reservoirs. The gas is vented from the upper portion of one reservoir to and from the upper portion of the other reservoir via tube 44 (in FIGURE 2) or vent hole 47 (in FIGURES 4–6). Low reservoir volumes are easily read in these embodiments since a wall of the upper reservoir is tapered.

Having described my invention, what is claimed is:

1. A liquid flow-volume measuring device comprising, in combination, a housing at least a portion of which is elastically deformable; a liquid impervious diaphragm positioned within said housing and dividing said housing into a first reservoir and a second reservoir, said diaphragm being formed to provide therein a liquid flow channel adjacent the periphery thereof, said channel connecting said first reservoir with said second reservoir; said elastically deformable housing portion being located adjacent said channel, deformation of said housing portion blocking said channel; said first reservoir further including an inlet; said second reservoir further including an outlet; and a vent connecting the upper portion of said first reservoir with the upper portion of said second reservoir.

2. A liquid flow-volume measuring device comprising, in combination, a housing including a top, a bottom and side portions, at least one of said side portions being elastically deformable; a liquid impervious diaphragm positioned within said housing and dividing said housing into a first and a second reservoir, at least one of said reservoirs including volumetric calibrations; said diaphragm being formed to provide a peripheral liquid flow channel connecting each of said reservoirs and located adjacent said elastically deformable side portion, deformation of said side portion blocking said flow channel; said first reservoir further including a liquid inlet; said second reservoir further including a liquid outlet, and a vent connecting the upper portion of said first reservoir with the upper portion of said second reservoir.

3. The liquid flow-volume measuring device of claim 2 wherein, further, said vent is located entirely within said housing and penetrates said diaphragm.

4. A liquid flow-volume measuring device comprising, in combination, a housing including a top, bottom and side portions; a liquid impervious diaphragm positioned within said housing and dividing said housing into a first reservoir zone and a second reservoir; a generally vertical tapered wall within said first zone, joined to said diaphragm at its bottom and to said side portions at its edges, said vertical wall creating, in conjunction with said side portions, a first reservoir within said first reservoir zone; said first reservoir zone further including an inlet to direct flow into said first reservoir; said diaphragm being formed to provide a liquid flow channel connecting said first reservoir with said second reservoir; means for closing said channel; an outlet in said second reservoir; and a vent passage connecting the upper part of said second reservoir and the upper part of said first reservoir.

5. A liquid flow-volume measuring device comprising, in combination, a housing including a top, a bottom and side portions, at least one of said side portions being elastically deformable; a liquid impervious diaphragm positioned within said housing and dividing said housing into a first reservoir zone and a second reservoir; a generally vertical tapered wall within said first zone, joined to said diaphragm at its bottom, to said side portions at its edges and in spaced apart relation to said housing top, said vertical wall creating a first reservoir within said first reservoir zone; said first reservoir zone further including an inlet adapted to direct flow into said first reservoir; said second reservoir further including an outlet; said diaphragm being formed to provide a peripheral liquid flow channel therein connecting each of said reservoirs and located adjacent said elastically deformable side portion, deformation of said side portion blocking said flow channel; a vent passage connecting the upper portion of said first reservoir and the upper portion of said second reservoir.

6. The apparatus of claim 5 wherein, further, said vent passage penetrates the diaphragm portion between said second reservoir and said first reservoir zone and is located entirely within said housing.

7. A liquid flow-volume measuring device comprising, in combination, a housing including a top, bottom and side portions, at least one of said side portions being elastically deformable; a liquid impervious diaphragm positioned transversely within said housing and dividing said housing into a first and a second portion said diaphragm being formed with a longitudinal peripheral flow channel therein; a calibrated generally funnel-shaped wall, the bottom of which is joined to the upper side of said diaphragm, located in said first portion, said funnel-shaped wall being in spaced-apart relationship to said housing; a conduit in said diaphragm leading from within the generally circular area described by the bottom of said wall to said peripheral longitudinal flow channel; said flow channel being adjacent to said deformable side portion, deformation of said side portion blocking said flow channel; an inlet in said first portion adapted to discharge into the confines of said funnel shaped wall; an outlet in said second portion; and a vent in said diaphragm without the confines of said wall connecting said second portion with said first portion.

8. A liquid flow-volume measuring device comprising, in combination, a housing; an internal liquid impervious member dividing said housing into a first and a second reservoir said internal member being formed with a normally-open liquid flow channel therein connecting said first reservoir and said second reservoir; said first reservoir including an inlet; said second reservoir including an outlet; means for closing said flow channel operable only from without said reservoirs; and a vent communicating between the upper portion of said first reservoir and the upper portion of said second reservoir.

9. A liquid flow-volume measuring device comprising, in combination, a housing; a liquid impervious diaphragm positioned within said housing to create a first reservoir and a second reservoir; said first reservoir including an inlet, said second reservoir including an outlet; a normally-open flow channel formed in said diaphragm connecting said first reservoir and said second reservoir; means for blocking said flow channel operable only from without said reservoirs; and a vent connecting the upper portion of said first reservoir with the upper portion of said second reservoir.

10. A liquid flow-volume measuring device comprising, in combination, a housing at least a portion of which is elastically deformable, a divider positioned within said housing so as to divide said housing into a first reservoir and a second reservoir; said first reservoir further including an inlet; said second reservoir further including an outlet; a liquid flow channel formed in said diaphragm connecting said reservoirs and operatively associated with said elastically deformable housing portion, deformation of said housing portion blocking said liquid flow channel; and vent means connecting the upper portion of said first reservoir and the upper portion of said second reservoir.

11. A liquid flow-volume measuring device comprising an upstream reservoir having a top inlet and a bottom outlet; a downstream reservoir located entirely beneath said upstream reservoir also having a top inlet and a bottom outlet, the inlet of said downstream reservoir being below the outlet of said upstream reservoir to maintain an hydraulic gradient therebetween; a vent connecting the upper portions of said reservoirs; normally-open conduit means connecting the outlet of said upstream reservoir and the inlet of said downstream reservoir, and means for blocking said conduit for a fixed period of time operable only from without said reservoirs.

12. The device of claim 11 wherein, further, at least one of said reservoirs is provided with volumetric calibrations.

13. The device of claim 11 wherein, further, both reservoirs have common side portions.

14. A method for measuring liquid flow-volume within a continuous full flowing liquid flow path comprising the steps of: establishing upper and lower reservoir zones, at least one of which has a known volume, in series; filling both of said zones with a gas which is limitedly absorbable in and inert to the liquid being measured; partially filling the lower zone with said liquid; connecting said reservoirs in series within the liquid flow path; blocking liquid communication between said zones for a fixed time interval without halting overall continuous liquid flow through said flow path; venting gas from the zone being filled to the zone being depleted; measuring the change in volume in at least one of the reservoir zones which occurs during said fixed time interval; re-establishing liquid communication between the zones; and venting gas from the zone being filled into the zone being emptied.

15. A method for measuring liquid flow volume comprising the steps of establishing an upstream and a downstream reservoir zone in series, at least one of said zones being of known volume; establishing a liquid level in said downstream zone using the same liquid as that which will be measured; allowing the balance of said downstream reservoir and the totality of said upstream reservoir to be filled with an inert, limitedly absorbable gas and maintaining thereafter a substantially constant total gas volume within said reservoirs; connecting said filled reservoirs in series within a continuous full-flowing liquid flow circuit; blocking liquid communication between said reservoir zones for a fixed time interval without interrupting the continuity of downstream discharge; shunting gas from the upstream reservoir into the downstream reservoir as it is displaced from said upstream reservoir by continuous liquid inlet flow; measuring the change in liquid volume in at least one of the reservoir zones which occurs during said fixed time interval; re-establishing liquid comunication between said zones and shunting gas back from the downstream zone into the upstream zone.

References Cited in the file of this patent

UNITED STATES PATENTS

| | | |
|---|---|---|
| 274,447 | Kennish | Mar. 20, 1883 |
| 628,581 | Grosswyler | July 11, 1899 |
| 1,786,090 | Schmidt et al. | Dec. 23, 1930 |
| 2,101,257 | Vogel-Jorgensen | Dec. 7, 1937 |
| 2,248,277 | Menard | July 8, 1941 |

FOREIGN PATENTS

| | | |
|---|---|---|
| 582,155 | Great Britain | Nov. 6, 1946 |
| 1,012,082 | Germany | July 11, 1957 |